Patented Mar. 2, 1943

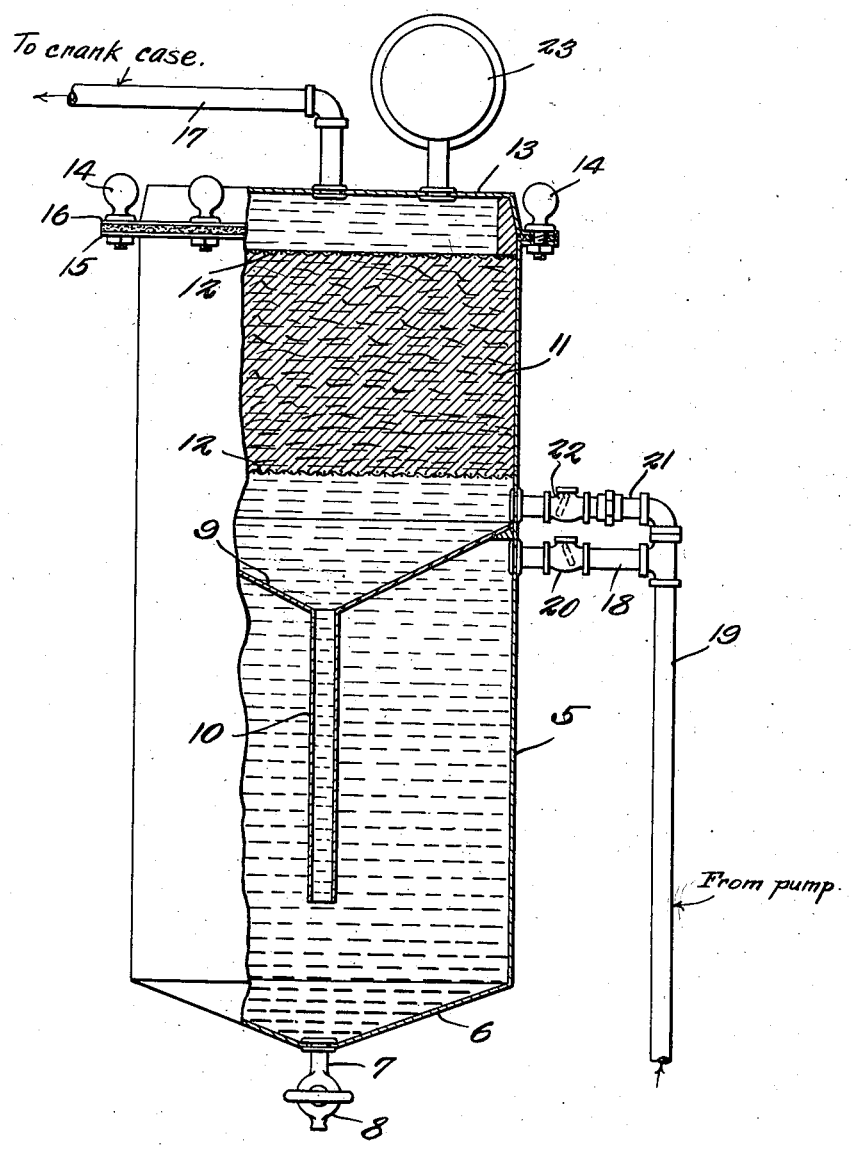

2,312,604

UNITED STATES PATENT OFFICE 2,312,604

DEVICE FOR CONDITIONING OIL

Arthur R. Thompson, Norfolk, Va.

Application October 5, 1939, Serial No. 298,153

1 Claim. (Cl. 210—140)

This invention relates to oil filters designed for use in connection with internal combustion engines, the primary object of the invention being to provide means for reconditioning the crank case oil of internal combustion engines, while in use, by removing foreign matter therefrom.

An important object of the invention is to provide a device of this character embodying a sediment tank into which the oil flows, the foreign matter in the oil gravitating to the bottom of the sediment tank where it may be removed, through the drain valve mounted in the bottom thereof.

A still further object of the invention is to provide means for reconditioning the crank case oil, to the end that it will be unnecessary to change the oil, as is the usual custom after the motor has been driven a predetermined number of miles.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing, the figure illustrates a device constructed in accordance with the invention, a portion thereof being broken away to illustrate the interior construction of the device.

Referring to the drawing in detail, the filter embodies a tank 5 having a funnel-shaped bottom 6 into which the pipe 7 extends, the pipe 7 being supplied with a drain valve 8 whereby foreign matter and impurities may be removed from the tank.

Disposed within the tank 5, at a point substantially intermediate the ends thereof, is a funnel-shaped partition 9 dividing the tank into an upper filtering chamber, and a lower sediment chamber. A pipe indicated at 10 connects with the funnel-shaped partition at the lowest point thereof, and extends to a point near the bottom 6, so that foreign matter may gravitate from the funnel-shaped partition 9, to the bottom of the tank.

Disposed directly above the funnel-shaped partition 9, is a filtering member 11, which is in the form of a pad constructed of suitable filtering material. The upper and lower surfaces of the filtering pad 11 are covered with wire mesh material indicated at 12. As shown, a cover indicated at 13 is fitted over the upper end of the tank, and is held in position by means of the winged bolts 14 that extend through aligning openings in the annular flanges 15 and 16 of the tank and cover. As shown, the cover 13 is of a construction to provide a space between the top of the filtering pad 11, and inner surface of the cover, providing a flow chamber through which the oil may pass into the pipe 17 that leads to the crank casing of the internal combustion engine with which the filtering device is used.

The reference character 18 indicates a pipe which establishes communication between the feed pipe 19 and sediment chamber, the pipe 18 connecting with the tank, near the upper end of the sediment chamber, or at a point in close proximity to the funnel-shaped partition 9, as clearly shown by the drawing. It will thus be seen that due to this construction, any foreign matter contained in the oil which is forced into the tank 5 at the time the motor with which the device is used is stopped, will gravitate to the bottom of the tank 5, the oil which has been purified or freed of such foreign matter, rising to the top of tank 5 below the partition 9, where it flows back into the pump, through pipe 19. A one-way valve 20 is mounted in the pipe 18, and permits oil to flow from the sediment tank to the pipe 19, but restricts return movement thereof. At the upper end of the pipe 19 is a pipe 21 which extends into the tank 5 at a point directly above the funnel-shaped bottom 9, so that oil may be forced through the pipe 19 directly into the tank, below the filtering pad. This pipe 20 is also provided with a one-way valve 22, which permits the oil to flow into the tank, but prevents the oil from returning into the pipe 19.

A suitable gauge indicated at 23 is mounted on the cover 13, and indicates the oil pressure in the filtering device.

From the foregoing it will be seen that oil passing to the crank casing of a motor vehicle, will be first directed into the tank 5, and forced upwardly through the filtering pad 11, where all foreign matter will be removed therefrom. It will of course be understood that the pipe 19 is connected with the oil pump of the motor, and the pipe 17 connects with the crank casing of the motor.

When the motor is stopped, it will be obvious that the foreign matter separated from the oil, by the filtering pad 11, will fall by gravity, onto the funnel-shaped partition 9, where it will pass into the pipe 10 and be deposited in the funnel-shaped bottom 6, where it may be removed, as previously stated.

The oil which is trapped at the upper end of the sediment tank, will pass into pipe 19, through the pipe 18 where it will mix with the oil used in lubricating the internal combustion engine.

In view of the foregoing disclosure, it is believed that a further description as to the operation of the filtering device is unnecessary.

What is claimed is:

In an oil filtering device for internal combustion engines, a body portion, a funnel-shaped partition dividing the body portion into upper and lower compartments, a pipe extending from the central portion of the funnel-shaped partition, the free end of said pipe terminating at a point adjacent to the bottom of the body portion and adapted to deliver oil to the bottom of the body portion, spaced upper and lower screening members partitioned within the body portion, filtering material held between the screening members, the upper screening member being spaced an appreciable distance below the top of the body portion providing an oil chamber at the top of the body portion, an outlet pipe adapted to connect with the crank case of a motor, extending into said chamber, an oil feed pipe adapted to be connected with the oil pump of the engine, extending into the body portion above the funnel-shaped chamber, a check valve in the feed pipe and adapted to prevent the return of oil through the oil feed pipe, a pipe extending from the oil feed pipe and communicating with the body portion below the partition, a one-way check valve in the latter pipe, whereby oil may flow from the body portion directly under the partition, to said feed pipe, and a drain pipe in the bottom of the body portion.

ARTHUR R. THOMPSON.